United States Patent [19]

Strange

[11] 3,869,597
[45] Mar. 4, 1975

[54] SELF-REGULATING PROPORTIONALLY CONTROLLED HEATING APPARATUS AND TECHNIQUE

[75] Inventor: Maxwell G. Strange, Fulton, Md.

[73] Assignee: The United States of America as represented by the Administrator of the National Aeronautics and Space Administration, Washington, D.C.

[22] Filed: Feb. 27, 1974

[21] Appl. No.: 446,569

[52] U.S. Cl................. 219/505, 219/497, 219/501
[51] Int. Cl. ......................................... H05b 1/02
[58] Field of Search ........... 219/494, 497, 499, 501, 219/504, 505

[56] References Cited
UNITED STATES PATENTS

| | | | |
|---|---|---|---|
| 3,546,436 | 12/1970 | Holzer | 219/504 |
| 3,752,956 | 8/1973 | Cahill et al. | 219/497 X |
| 3,789,190 | 1/1974 | Orosy | 219/497 |
| 3,821,516 | 6/1974 | Hayes | 219/497 |

Primary Examiner—J. D. Miller
Assistant Examiner—Fred E. Bell
Attorney, Agent, or Firm—Robert F. Kempf; John R. Manning

[57] ABSTRACT

A self-regulating proportionally controlled heating apparatus and technique is provided wherein a single electrical resistance heating element having a temperature coefficient of resistance serves simultaneously as a heater and temperature sensor. The heating element is current-driven and the voltage drop across the heating element is monitored and a component extracted therefrom which is attributable to a change in actual temperature of the heating element from a desired reference temperature, so as to produce a resulting error signal. The error signal is utilized to control the level of the heater drive current and, thereby, the actual heater temperature in a direction to reduce the noted temperature difference. The continuous nature of the process for deriving the error signal feedback information results in true proportional control of the heating element without the necessity for current-switching which may interfere with nearby sensitive circuits, and with no cyclical variation in the controlled temperature.

5 Claims, 3 Drawing Figures

PATENTED MAR 4 1975  3,869,597

SELF-REGULATING PROPORTIONALLY CONTROLLED HEATING APPARATUS AND TECHNIQUE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention generally relates to resistance heating and is particularly concerned with a precision self-controlling temperature technique therefor in which the temperature coefficient of resistance of the heating element is utilized for the temperature sensing function.

Conventional techniques of heater control typically involve the provision of a separate heating element along with a separate temperature sensing element therefor, the energization of the heater element being controlled by the sensing element through feedback circuit loops. Such a conventional system is quite disadvantageous in applications wherein it is impractical or undesirable to mount both a separate heater and a separate sensor element, such applications being found in the miniaturization or thin filament arts.

In recognition of the undesirability of the provision of a separate heating element and a separate temperature sensor therefor, improvements have been made in the art wherein a single element, such as an electrical resistance heating element having a temperature coefficient of resistance, is utilized both as the heat generating source as well as the temperature sensing mechanism. In this respect, such improved heating techniques typically utilize the resistance change of the heating element to measure the element temperature, this measurement being utilized to control the temperature of the heating element by altering the power input to the heating element. Typical of such improved prior art systems are those temperature control techniques described in U.S. Pat. Nos. 3,546,436, 3,700,933, and 3,708,652.

These improved prior art techniques, while constituting a marked advance over the provision of separate heating elements and sensors therefor, still do not overcome all problems associated with precision temperature control. For example, the control of the power to the heating element in the system types exemplified by those disclosed in the above-enumerated patents is discontinuous. For example, the power to the heater element may be switched in an on-off cyclical manner which does not permit a constant controlled temperature of the heater element but rather requires that the temperature of the heater element vary slightly in a cyclical manner as the power thereto is switched on and off in an effort to maintain the nominal "reference" temperature of the element. The required on-off power control switching readily disturbs nearby sensitive circuits and introduces interference which is generated in the switching process.

Alternatively, some systems exemplified by the above-enumerated patents utilize a pulsating power source to control the input to the heater element. In this instance, as in the above "on-off" approach, control of the input power to the heater element is discontinuous, allowing the controlled temperature to cyclically fluctuate about the reference temperature. Further, a pulsating heater drive source is likewise prone to producing interference in sensitive circuits as is the case with on-off heater power switching.

SUMMARY OF THE INVENTION

It is thus apparent that a need still exists in the art for the provision of a temperature control technique for a heating element which serves as both the heating source and the temperature sensor, which temperature control technique does not suffer from the disadvantages of the prior art and allows for a perfectly smooth, highly accurate, and non-interference-generating control of temperature. It is the primary objective of the instant invention to provide such a novel technique and apparatus.

A further objective of the instant invention concerns the provision of a self-controlled heating apparatus wherein the temperature thereof is controlled in a continuous and proportional manner, rather than in a cyclical manner.

A further objective of the instant invention is the provision of a temperature control technique for a heating apparatus of the type described wherein the temperature of the heating element is continuously sensed simultaneously with the generation of heating drive current so as to enable true proportional control of the heater temperature.

These objects, as well as others which will become apparent from the following description, are implemented by the instant invention which, as aforementioned, utilizes an electrical resistance heating element having a temperature coefficient of resistance as both the heat source and as the temperature sensor. The resistance heater element is continuously current-driven so that the element produces heat, while the voltage drop across the resistance heater element is simultaneously monitored. Only that portion or component of the voltage drop across the heater element which is attributable to a change in actual temperature of the heating element is extracted so as to provide a signal representative of the actual temperature of the heating element. In the preferred inventive embodiment, this extraction technique is accomplished by electronically off-setting the monitored voltage drop by an amount proportional to the heater drive current at a suitable reference temperature, with the off-set voltage drop then being divided by a term similarly proportional to the instantaneous heater drive current, thereby providing a signal voltage representative of the actual heater temperature.

This signal voltage is continuously compared with a reference voltage or signal which is representative of the actual desired temperature of the heater element, any noted difference constituting an error signal which is utilized to control the instantaneous level of the heater drive current in a direction to reduce the error and to return the heating element to the desired temperature.

The continuous and simultaneous occurrence of the heating and sensing functions enables true proportional control of the temperature of the heating element.

BRIEF DESCRIPTION OF THE DRAWINGS

The invention will be better understood, and further features and advantages thereof will become apparent, from the following detailed description of a preferred inventive embodiment, such description making reference to the appended sheet of drawings, wherein.

DETAILED DESCRIPTION OF A PREFERRED INVENTIVE EMBODIMENT

Figure 2:
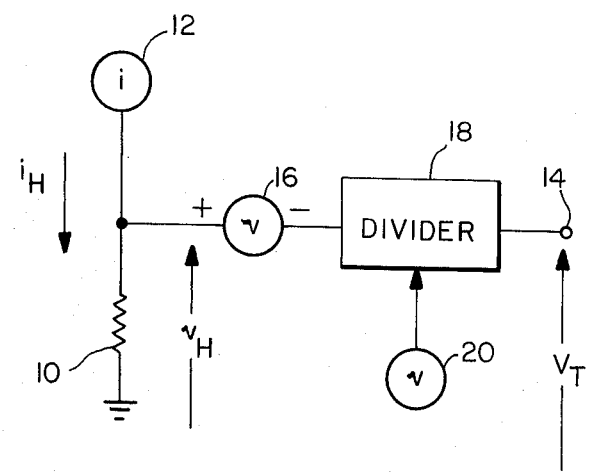
FIG. 2 is an electrical schematic diagram illustrating the theoretical basis on which the temperature of such a heating element can be measured even when the input current drive thereto varies as occurs in a self-regulating control feedback loop therefor.
Figure 3:
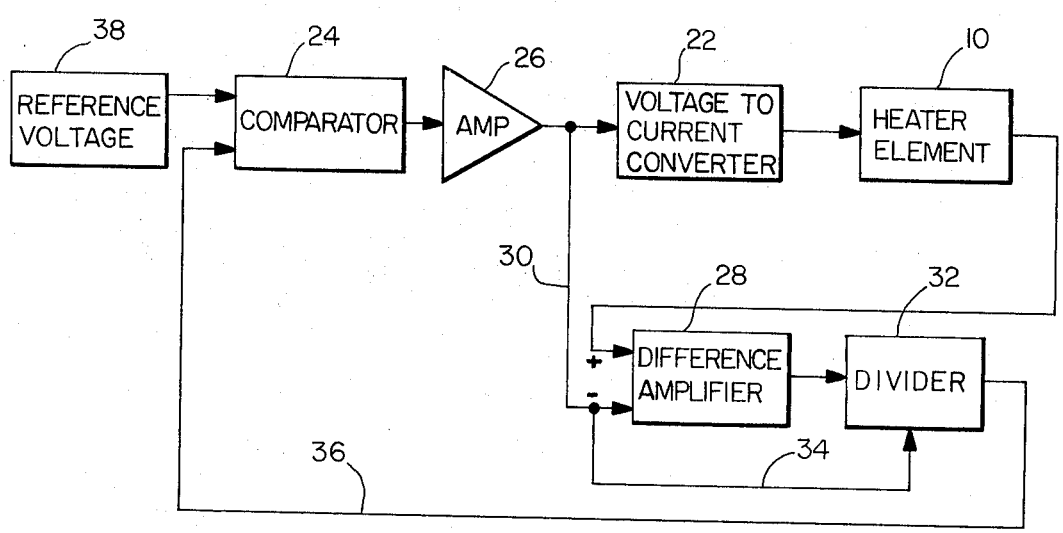
FIG. 3 is an electrical schematic diagram of one preferred operational embodiment of the self-regulating proportionally controlled heating apparatus of the instant invention.

Prior to a detailed discussion of the preferred inventive embodiment of FIG. 3, it will be useful to discuss the theoretical basis of the method for deriving a temperature measurement of a heater element having a temperature coefficient of resistance. In this respect, reference will be made to FIGS. 1 and 2 of the application drawings.

As previously discussed, true proportional control of the temperature of such a heating element can only be achieved with the simultaneous generation of a power drive to the heating element and a sensing of the temperature thereof, these functions taking place in a simultaneous and continuous manner. With specific reference to FIG. 1 of the application drawings, reference numeral 10 indicates a heater element which has a temperature coefficient of resistance. The heater element 10 is assumed to be always driven by a true current source 12 which, in this illustration, provides a constant level heater drive current represented by $I_H$, as shown. Assuming that the nominal resistance of element 10 at a reference temperature $T$ is $R_0$, then the instantaneous resistance $r_H$ of element 10 upon a change in temperature $\Delta T$ is:

$$r_h = R_0 + \alpha R_0 \Delta T \tag{1}$$

wherein $\alpha$ equals the temperature coefficient of resistivity of element 10.

The voltage drop across the resistance heater element 10 therefore can be defined as follows:

$$v_H = I_H r_H = I_H R_0 + I_H \alpha R_0 \Delta T \tag{2}$$

To provide a calibrated output voltage at terminal 14 which has a zero value when the instantaneous resistance $r_H$ of the heating element 10 equals its nominal resistance $R_0$ at the calibrated or reference temperature $T$, it is only necessary to offset the heater voltage $v_H$ by a fixed amount $V$ as is represented by voltage source 16.

Assuming $V = I_H R_0$, then the output voltage at terminal 14 is proportional to the change in temperature of the heater element 10 as follows:

$$v_T = v_H - V = I_H \alpha R_0 \Delta T = k \Delta T \tag{4}$$

Figure 1:
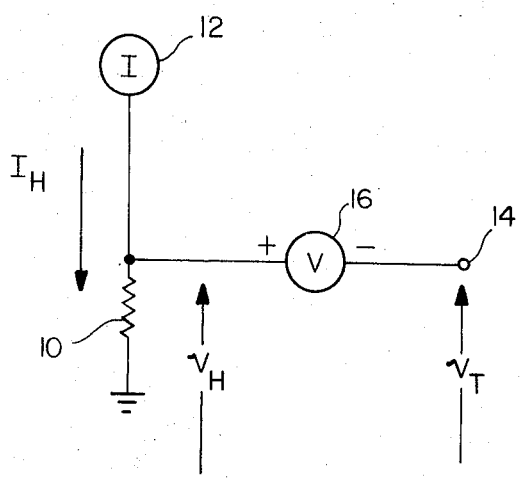
FIG. 1 is an electrical schematic diagram illustrating the theoretical basis upon which the actual temperature can be measured of a heating element having a temperature coefficient of resistance, considering a constant current drive thereto.

Accordingly, with a constant current drive, the simple circuit of FIG. 1 can readily be utilized to monitor the temperature of a heater element having a temperature coefficient of resistance.

The principles of FIG. 1 can also be applied to a situation wherein the heater current is varied by an error signal to correct for forward gain disturbances in the heater element temperature as would be necessary to achieve self-regulating closed-loop control. In this instance, and with particular reference now being made to FIG. 2 of the application drawings, let it be assumed that the current source 12 for the heater element 10 generates a variable current drive having an instantaneous value $i_H$. In this instance, the voltage drop $v_H$ across the heater element 10 can be expressed as follows, under the condition of a changing temperature $\Delta T$:

$$v_H = i_H (R_0 + \alpha R_0 \Delta T) \tag{5}$$

The offsetting voltage source 16 must in this instance generate a variable voltage that is proportional to the heater current in view of the fact that the heater current itself is variable. Thus, the offsetting voltage can be expressed as:

$$v = i_H R_0 \tag{6}$$

The output that would be obtained from offsetting the heater voltage $v_H$ by the voltage $v$ from source 16 is expressed as follows:

$$v_H - v = i_H (R_0 + \alpha R_0 \Delta T) - i_H R_0 \tag{7}$$

By rearranging terms of equation 7, the following equation is derived:

$$v_H - v = i_H \alpha R_0 \Delta T \tag{8}$$

Note that this expression cannot directly be utilized as representing an output voltage proportional to the change in temperature $\Delta T$ of the heater element 10, in that the equation contains a further variable, i.e., the instantaneous heater current $i_H$. When the heater current varies, the heater voltage will vary proportionally in accordance with Ohm's Law, even at a fixed heater temperature. It is therefore necessary to divide the expression for offset heater voltage by a term proportional to heater current so as to separate the component of heater voltage which is a function of heater temperature alone.

It is for this reason that in the variable drive embodiment of FIG. 2, a divider means 18 is provided which serves to divide the "offset" heater element voltage of equation 8 by a voltage value which is proportional to heater current, such as the voltage value $v$ of equation 6 which is represented as being generated by element 20. Thus, dividing equation 8 by equation 6, an output voltage $v_T$ at terminal 14 can be obtained as follows:

$$v_T = (i_H \alpha R_0 \Delta T)/(i_H R_0) = \alpha \Delta T \qquad (9)$$

This output voltage is proportional to the change in temperature $\Delta T$ of the heating element 10 and therefore can be used as a suitable measurement value in the situation wherein closed-loop control and consequent variable current drive for the heater element exists.

This theoretical discussion lies at the heart of the instant invention in that what has been illustrated in a novel technique for continuously deriving a signal from the voltage drop across the heating element which is representative of only that component of the voltage drop which is attributable to a change in acutal temperature of the heating element. As can be appreciated, if this temperature signal $v_T$ is compared with a reference voltage signal which represents the desired temperature $T$ of the heater element, an error signal can be generated which can be applied in a closed-loop feedback path to the current generating element 12 so as to control the instantaneous level of the current drive $i_H$ through the heating element in a direction to return the heating element to the reference temperature $T$. Thus, with this novel technique of the instant invention, true proportional and continuous control of the temperature of a heating element can be achieved.

The application of this technique to a complete heating apparatus can best be seen by reference now to FIG. 3 of the application drawings wherein a preferred embodiment of the heating apparatus is shown, this apparatus carrying out the technique illustrated in FIG. 2 of the application drawings in a closedloop self-regulating fashion.

In FIG. 3, the heater element having a temperature coefficient of resistance is again designated by reference numeral 10 and the current drive to the heater element 10 is preferably obtained by a voltage to current converter 22 which is linearly responsive to an input voltage in conventional fashion, the input voltage being generated by the output of a voltage comparator 24 coupled through a DC amplifier 26 as will be more fully described hereinbelow.

The voltage drop across the heater element 10 is provided as one input to a difference amplifier 28, the other input to the difference amplifier 28 being obtained from the output of amplifier 26. This output which appears on line 30 will be recognized as comprising a convenient source of "offsetting" voltage such as that given by equation 6. the difference amplifier 28 serves to generate an output voltage which is thereby representative of the difference between the voltage drop across the heater element 10 and the voltage proportional to the instantaneous level of the heater element current drive, the output from difference amplifier 28 being that represented by equation 8. The output from difference amplifier 28 is then divided by a voltage proportional to the instantaneous level of the heater element current drive, such latter voltage also conveniently being taken from the output of the amplifier 26, through conductors 30 and 34 as shown. Thus, the output of the voltage divider means 32 will be proportional to the actual temperature of the heater element 10, such as shown in equation 9.

This output voltage is fed back to comparator 24 along conductor 36, comparator 24 generating an output voltage which is representative of the difference between the output voltage from the divider 32, and a voltage representative of the desired temperature of the heater element as is generated by the reference voltage generator means 38, reference voltage generator means 38 thereby constituting the temperature setting mechanism of the heating apparatus. The output of comparator 24 is amplified as aforementioned and constitutes the error signal voltage which drives the voltage to current converter 22 in a fashion so as to reduce the temperature error and hold the heating element 10 at the desired temperature, in typical closed-loop control fashion.

As has been illustrated in FIG. 3 of the application drawings, simple analog computational techniques and conventional elements therefor are sufficient to carry into practice an entirely novel precision temperature control technique as is broadly taught by the theoretical discussion having reference to FIG. 2 of the application.

From the foregoing detailed description, it should be apparent that the objectives set forth at the outset of this specification have been successfully achieved. Moreover, while there has been shown and described a present preferred embodiment of the invention, it is to be distinctly understood by those skilled in the art that the invention is not limited thereto, but may otherwise be variously embodied and practiced within the scope of the following claims.

Accordingly, What is claimed is:

1. A self-regulating controlled heating apparatus, said apparatus comprising:
   an a electrical resistance heating element having a temperature coefficient of resistance;
   current generator means coupled to said heating element for continuously current driving said heating element, said current generator means being responsive to an error signal to modify the level of the current drive; and
   error signal generator means coupled to said heating element, said error signal generator means monitoring the voltage drop across said heating element and deriving an error signal therefrom representative of only that component of the voltage drop attributable to a change in actual temperature of said heating element from a desired reference temperature;
   said error signal generator means further being connected in a feedback loop to said current generator means such that said error signal continuously effects a modification of the level of the current drive from said current generator means to return said heating element to said reference temperature.

2. A heating apparatus as defined in claim 1, wherein said error signal generator means comprises:
   difference amplifier means for generating an output voltage representative of the difference between the voltage drop across said heater element and a voltage proportional to the level of the heater element current drive;
   divider means for generating an output voltage representative of the quotient of a division of said output voltage of said difference amplifier means by a voltage proportional to the instantaneous level of the heater element current drive, said output voltage thereby being proportional to the actual temperature of said heater element; and means for generating an output voltage representative of the difference between said output voltage of said divider means and a voltage representative of the desired temperature of said heater element, said output voltage defining said error signal.

3. A heating apparatus as defined in claim 2, wherein said current generator means comprises voltage-to-current converter means responsive to said error signal output voltage to generate said heater element current drive.

4. A method of effecting continuous and proportional self-control of the temperature of an electrical heating element having a temperature coefficient of resistance, said method comprising the steps of:
   continuously current-driving the resistance heater element;
   simultaneously monitoring the voltage drop across the resistance heater element;
   electrically offsetting the monitored voltage drop by an amount proportional to the heater drive current;
   electrically dividing the offset voltage drop by a term similarly proportional to the instantaneous heater drive current, to thereby provide a signal voltage representative of the actual heater temperature;
   electrically comparing the actual temperature signal voltage with a value representative of the desired heater temperature to provide a difference signal; and
   modifying the heater drive current in response to the difference signal in a direction to reduce said difference signal.

5. In a heating apparatus wherein an electrical resistance heating element having a temperature coefficient of resistance is continuously driven by a current source having a variable output level, the improvement of a means for monitoring the actual temperature of the heating element, said improvement comprising;
   means for monitoring the voltage drop across the resistance heater element while the heater element is being currentdriven;
   means for electrically offsetting the monitored voltage drop by an amount proportional to the heater drive current; and
   means for electrically dividing the offset voltage drop by a term similarly proportional to the instantaneous heater drive current, to thereby provide a signal voltage representative of the actual heater temperature.

* * * * *